S. Bourne,
Vent Pegs,
No. 63,202. Patented Mar. 26, 1867.

Witnesses
F. H. Jackson
Alex. F. Roberts

Inventor;
S. Bourne
Per Munn & Co
Attorneys

United States Patent Office.

STEPHEN BOURNE, OF HEADSTONE DRIVE, HARROW, GREAT BRITAIN

Letters Patent No. 63,202, dated March 26, 1867.

IMPROVEMENT IN VENT-PEGS AND VALVES FOR BEER CASKS.

*The Schedule referred to in these Letters Patent and making part of the same.*

TO ALL WHOM IT MAY CONCERN:

Be it known that I, STEPHEN BOURNE, of Headstone Drive, Harrow, in the county of Middlesex, in that part of the United Kingdom of Great Britain called England, have invented certain new and useful improvements in Vent-Pegs or Valves chiefly applicable to Beer and like Casks, Barrels, etc.; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

This invention consists in making the valve or vent-peg, whether in the form or shape of a flat disk or of a tube, either conical or cylindrical, or of any other shape which may be suitable, of India rubber, or any other suitable elastic material, in which one or more apertures, perforations, slits, or other openings are made in such a manner that, by the elasticity of the rubber or other material used, they will be held closed, while by the extension of the rubber they will be opened, and thus a communication established through them between the inner and outer, or the two faces or sides of the valve or vent-peg; the valves or vent-pegs made according to the present invention being intended more especially for use in casks or barrels, or other vessels containing beer, ale, and other similar liquids, although they can be adapted for other and various purposes, and the object of their use being to regulate the passage of air or gas to or from the said casks, etc.

Having thus in general terms stated the nature and principles of the present invention, I will now proceed to describe the same in detail, reference being had to the accompanying plate of drawings, in which—

Figure 1:
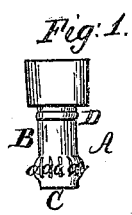

Figure 1 is a side view of a vent-peg made according to the present invention.

Figure 3:
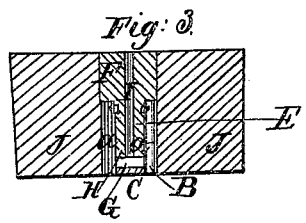
Figure 2:
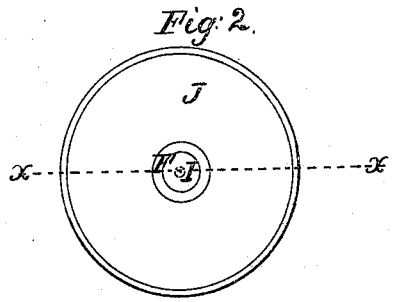
Figure 8:
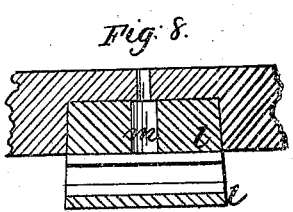

Figure 2, a plan or top view of a stopper, having a vent-peg such as is shown in fig. 1 inserted in it; and Figure 3 a vertical section taken in the plane of the line $x\,x$, fig. 2.

A, in the drawings, represents my new and improved valve, which in the present instance is made in the form of a hollow tube, B, of a cylindrical form, closed at one end, C, and at its other secured by means of a ring, D, over and upon a protruding nipple, E, of a plug or stopper, F. The valve is made of India rubber or other elastic material suitable for the purpose, and is a little longer than the nipple E, on which it is secured, forming or leaving a space or channel, G, between the outer end H of such nipple and the closed end or head-plate C of the tube B. Through the nipple E and the stopper or plug F, of which it forms a part, a hole, I, is bored, establishing a communication between the inside of the tube-valve and the outside of the plug. The India-rubber tube, at such portion of the same as surrounds the nipple and is in contact with the sides of the same, is provided with a series of slits, $a$, entirely around it, which slits $a$ are made in the rubber tube when distended, so that when the rubber resumes its original condition, or the force by which it is distended is removed, such slits will be thereby closed; these slits when opened, from the distension of the rubber by pressure or otherwise, forming a communication through the rubber tube and central bore of the stopper, which communication is closed when the rubber is not distended. The stopper to which the rubber tube-valve B is secured, as above explained, is driven into the centre of a larger plug or stopper, J, which in its turn is driven into a hole bored through the bung or any other portion of the staves or head of the cask, barrel, or other vessel, in connection with which the valve is to be used, with the rubber tube-valve, upon the inside of the said cask, barrel, or other vessel. When the contents of the cask, etc., are to be drawn off, air enters through the top of the centre-bored stopper or plug, and passing through it escapes, at its lower end, into the interior of the India-rubber tube, from whence it passes to the cask, or other vessel, through the small perforations or slits in the tube.

In the application of my improved valve or vent-peg it is preferable that it should be inserted in the staves of the cask or barrel, for the reason that, when the cask or barrel is on its side, the valve may be at the top of the cask, this being the more desirable when the valve is constructed in such a manner as to allow the gas or air occupying the upper portion of the cask, to which the valve may be applied, to pass from the cask through the valve; valves of which construction and arrangement will be now explained, it being premised, however, that the principle in forming the valve, as was herein previously stated, remains the same.

Figure 4:

In Figure 4 of the drawings an escape-valve is shown, which in the present instance is composed of a disk, b, of India rubber, or other suitable material, and is placed across a hole in one of the staves of the cask or barrel, similar to the ordinary bung-hole of a cask, where it is secured in the following manner: The top of the bung-hole is closed with a plug of wood, c, which has a small hole, d, through its centre; the bottom of the plug is also closed with a similar plug, e, and between these two plugs the edges of the India-rubber disk b are nipped, so that a tight joint is made. Through the rubber disk numerous small holes are perforated, either by a fine-pointed needle, or otherwise, in such a manner that when the rubber is distended such holes will be thereby opened, but on the contrary closed as the rubber resumes its original form or state.

From the construction of the valve and its arrangement in the bung-hole of a cask, as above explained, it is plain to be understood that, if the bung-hole of the cask is placed uppermost, any pressure from the interior of the cask will cause the holes in the disk to open, and so allow the excess of gas to pass from the cask. This valve, however, will not allow air to enter the cask when any of its contents are withdrawn, as the pressure of the air would not be sufficient to open the holes in the India-rubber disk.

Figure 5:
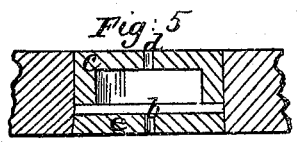

In Figure 5 another valve is shown, the operation of which is substantially similar to that above described and shown in fig. 4, the difference consisting in using a flat disk for the lower or inner plug e, in lieu of one hollowed out, as shown in fig. 4, the rubber disk resting upon and against this flat plug.

Figure 6:

In Figure 6 a similar flat-shaped disk-valve is shown, the only difference between it and those shown in figs. 4 and 5 consisting in the mode of securing it in and to a stave of the cask, barrel, or other vessel, the operation being the same.

Figure 7:
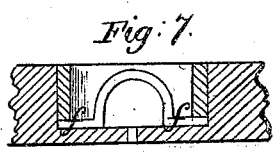

In Figure 7, in lieu of the valve being made of a flat or disk-shaped piece of India rubber, it is made of a conical or arched form, with a flange, f, around it, by which it is held in its place in a hole in one of the staves or the bung. This flange is shown as held by a tube, by preference of metal, or it may be secured in place in any other proper manner, the cone of India rubber being open at its bottom to the interior of the cask, so that when there is any pressure of gas within the cask the holes will open and allow the gas to escape therefrom, but no air to enter the cask, as any pressure of air on the exterior of the cone only tends to close the fine holes through it.

Figure 8:
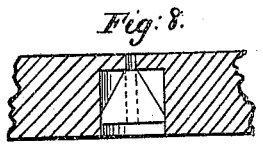

In the valve shown in Figure 8 a perforated cone of India rubber is employed, which cone at its upper end is closed, and supported on its interior with a cone of wood or other material. The wood cone is driven into a hole upon the interior of the cask, partially through one of the staves or the bung, and a small passage is formed through the cone from its top to its bottom, so that gas may pass from the cask through this hole into the interior of the rubber cone, escaping through its perforations, and passing away through the small hole which is made entirely through the stave or bung. In fig. 8 another form of valve is shown, which in this instance is of a tube shape, provided with a series of perforations, this tube being open at both ends and placed in a hole bored transversely across a plug of wood, l. This tube has an enlargement at each end, so as to fit tightly into the ends of the hole of the plug. This plug is also provided with a hole, m, leading from its top to the transverse hole formed through it. The plug of wood so fitted with a tube is driven into a hole formed on the inner face of a stave, or bung, and partially through it. When there is any pressure in the interior of the cask the gas passes through the fine perforations in the rubber tube, into the transverse hole in the plug, escaping therefrom through the small hole, and thence out through the hole entirely through the stave or bung.

Figure 9:
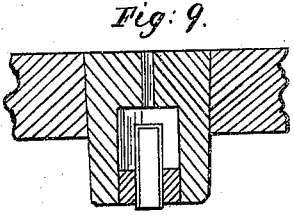

In the valve shown in Figure 9 a small tube of India rubber is shown, which in construction is similar to that shown in the first four figures of the drawings, and hereinbefore described, but is arranged in the stave or bung of a cask so as to allow the air or gas to escape therefrom, in lieu of centring the same, as described for the other tube.

Having thus described my invention, what I claim as new, and desire to secure by Letters Patent, is—

A valve made of India rubber, or other elastic or suitable material, whether in the form of a disk, cone, cylinder, or any other proper shape, when said valve is provided with one or more perforations, slits, or other openings, in such a manner that by the distension of the rubber its perforations will be opened, but closed by its elasticity, substantially as and for the purposes described.

The above specification of my invention signed by me this nineteenth day of June, 1866.

STE. BOURNE.

Witnesses:
G. F. WARREN,
JOHN DEAN,
} Both of No. 17 Gracechurch street, London.